(12) United States Patent  (10) Patent No.: US 7,448,660 B2
Yamanaka et al.  (45) Date of Patent: Nov. 11, 2008

(54) TONGS WITH ENCAPSULATED LOCKING MECHANISM

(75) Inventors: Shunji Yamanaka, Tokyo (JP); Hisato Ogata, Tokyo (JP); Eugene Kaneko, Astoria, NY (US)

(73) Assignee: Helen of Troy Limited, St. Michael (BB)

( * ) Notice: Subject to any disclaimer, the term of this patent is extended or adjusted under 35 U.S.C. 154(b) by 462 days.

(21) Appl. No.: 11/283,101

(22) Filed: Nov. 18, 2005

(65) Prior Publication Data

US 2007/0130034 A1 Jun. 7, 2007

(51) Int. Cl.
*A47G 21/10* (2006.01)
*A47J 43/28* (2006.01)

(52) U.S. Cl. ........................................ 294/16; 294/99.2

(58) Field of Classification Search ................... 294/16, 294/99.2, 106, 28, 3, 8.5, 11; D7/686
See application file for complete search history.

(56) References Cited

U.S. PATENT DOCUMENTS

| 4,728,139 | A | 3/1988 | Oretti |
| 5,199,756 | A | 4/1993 | Bartlett et al. |
| 5,447,351 | A | 9/1995 | Klunder |
| 6,056,338 | A | 5/2000 | Kerr |
| 6,089,631 | A | 7/2000 | Thurlow et al. |
| 6,092,847 | A | 7/2000 | Kwan |
| 6,217,092 | B1 | 4/2001 | Spicker |
| 6,536,819 | B2 | 3/2003 | Wang et al. |
| 6,553,898 | B2 | 4/2003 | Folkertsma |
| D488,032 | S | 4/2004 | Best et al. |
| 6,869,117 | B1 | 3/2005 | Blum |
| D509,413 | S * | 9/2005 | Marsden et al. ............... D7/686 |
| 7,086,676 | B2 * | 8/2006 | Sumter et al. .................. 294/16 |
| 7,261,348 | B1 * | 8/2007 | Fried ............................. 294/16 |
| 7,311,344 | B2 * | 12/2007 | Kerr et al. ...................... 294/16 |
| 2004/0239129 | A1 | 12/2004 | Sumter et al. |

* cited by examiner

*Primary Examiner*—Dean J Kramer
(74) *Attorney, Agent, or Firm*—Seyfarth Shaw LLP

(57) ABSTRACT

A pair of locking kitchen tongs for use in handling food items and the like is disclosed. The tongs have a pair of rigid steel arms each having a workpiece engaging or grasping end, a body portion and a pivot end from which the arms are pivotally connected together. The grasping ends are preferably scalloped along one edge, for handling relatively large items, and serrated (i.e., fine-toothed) along another edge, for handling of smaller or fine items. A bulbous, tear-shaped body made from a rigid, non-metal material encapsulates the pivot ends of the two arms as they are pivotally connected together to permit movement between an open position and a closed position. Also within and coupled to the encapsulating body is a sliding locking plate. The locking plate has a body defining a slot which allows the locking plate to slide between a locked position, maintaining the arms in their closed position, and an unlocked position, allowing them free pivoting movement.

20 Claims, 5 Drawing Sheets

TONGS WITH ENCAPSULATED LOCKING MECHANISM

BACKGROUND OF THE INVENTION

This application relates to household kitchen tools. In particular, this application relates to hand-held tongs of the type used to handle and serve food. The application relates most specifically to hand-held tongs having a locking mechanism.

Tongs of the common form include a pair of pivoting arms, usually made of a metal or a hard plastic, either with or without similarly or differently contoured ends for grasping food and the like. The contoured ends are typically flared to allow for manipulation of relatively broad foods, such as, for example, burgers, bratwurst, bread rolls, fish fillets, pastries and the like. Alternatively, the tongs may be smaller in size with a serrated edge for grasping of relatively small or narrow goods, such as, for example, ice cubes, olives, carrot sticks, garnishes and such. However, it is sometimes inconvenient to have two different tongs to handle these tasks, when one pair could easily be equipped to operate properly for both. Those skilled in the art have failed to recognize the advantages of such a design possibility.

Additionally, some prior art tongs have been designed with a locking mechanism to allow the tongs to be stored in a closed position. This has been achieved in a variety of ways, including a locking collar as shown in U.S. Pat. No. 4,728,139 to Oretti, a locking plate as shown in U.S. Pat. No. 5,199,756 to Bartlett et al., and a locking pull ring as shown in U.S. Pat. No. 6,056,338 to Kerr. However, such locking devices are sometimes cumbersome, easily jammed, or too easily accidentally unlocked when washed and/or stored.

The present invention is unique in that it addresses each of these, as well as other problems found in the prior art. By providing a pair of kitchen tongs, and generally a kitchen utensil, which is suitably configured to handle both large and small food items and has an encapsulated locking mechanism which provides a greater ease of use and protection of the locking mechanism. The present invention solves these and other problems in prior art devices.

SUMMARY OF THE INVENTION

There is disclosed herein an improved kitchen utensil which avoids the disadvantages of prior devices while affording additional structural and operating advantages.

In an embodiment there is provided a kitchen utensil, specifically a pair of tongs, comprising a first arm having a workpiece engaging end and a pivot end, and a second arm having a workpiece engaging end and a pivot end, wherein the first and second arms are pivotally connected together proximate their respective pivot ends by a pivot pin to allow pivoting of the first and second arms to all points within a range from an open position to a close position. A biasing member is positioned to engage and bias the first and second arms to the open position, and a sliding locking plate having a slot through which the pivot pin passes to allow movement of the locking plate between a first position and a second position, and a body adjacent the slot such that the body engages the pivot ends of the first and second arms when in the first position to lock the arms in a close position. Finally, a handle encapsulating and coupled to the locking plate protects the locking mechanism and provides a greater ease of use.

In one aspect of the locking tongs, the handle encapsulates the pivot end of the arms and is comprised of a rigid material. It may be alternatively or additionally comprised of a resilient material. Movement of the handle preferably actuates the locking plate between the first position and the second position.

Another aspect of an embodiment of the invention includes the workpiece engaging ends of the first arm and the second arm having first and second edges with at least one of the workpiece engaging ends being scalloped and a portion of the second edge of at least one of the workpiece engaging ends being serrated.

In an alternative embodiment, a non-metal sliding locking plate may be used, separate from or integral to a non-metal handle encapsulating and coupled to the locking plate.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
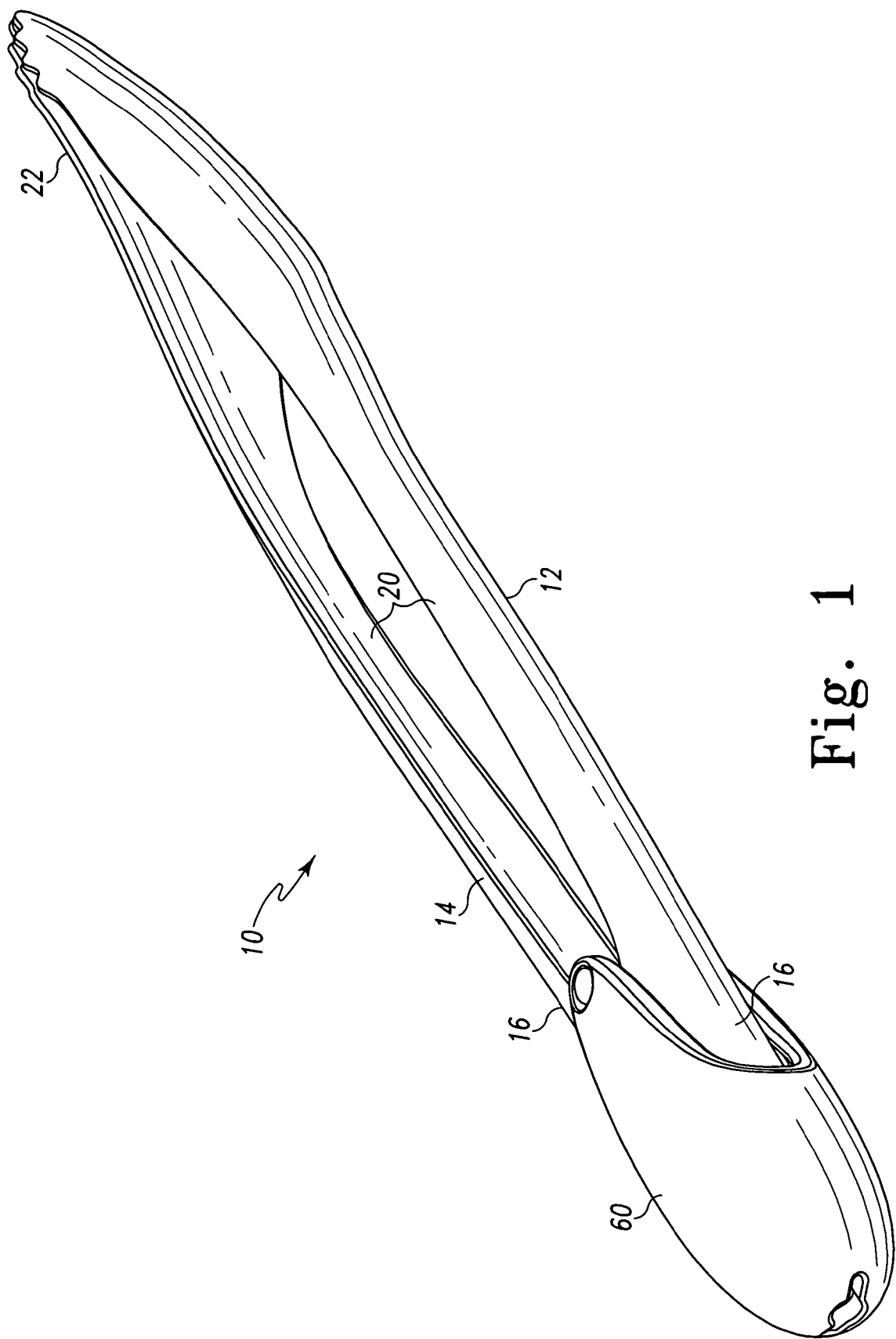
FIG. 1 is a perspective view illustrating one embodiment of the present tongs.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-5, there is illustrated a kitchen utensil, namely tongs, generally designated by the numeral 10. The tongs 10 have a first arm 12 pivotally connected to a second arm 14 at a pivot point. Each arm is comprised of a pivot end 16, a body portion 20 and a workpiece engaging or grasping end 22.

Figure 4:
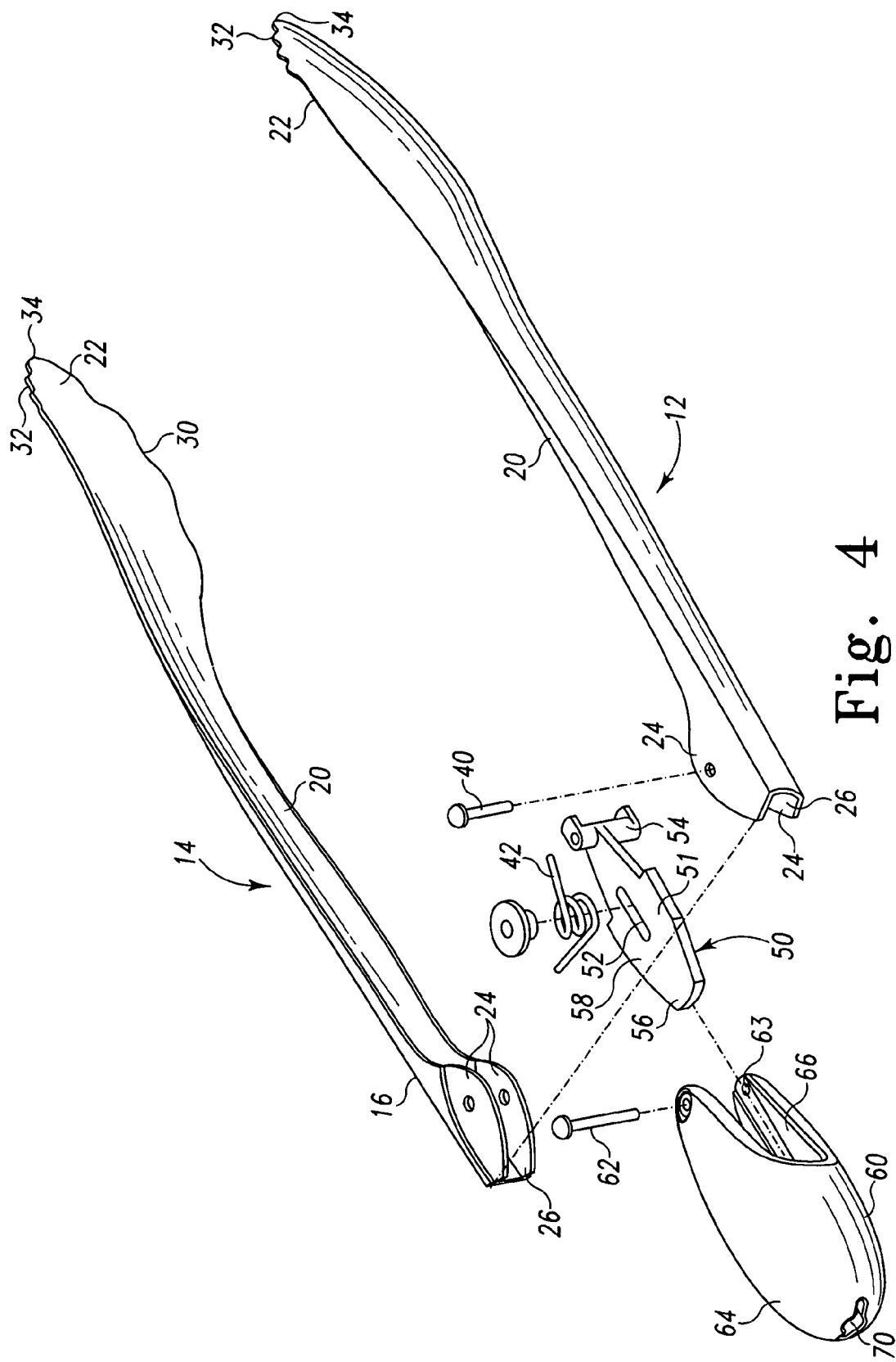
FIG. 4 is an exploded view of the tongs of FIG. 1.

As shown in FIG. 4, the pivot end 16 of each arm 12, 14 has a substantially U-shaped cross section with a small lobe 24 on each side of channel 26 to facilitate connection. The width of the two channels 26 are such that one fits into the span of the other as the lobes 24 overlap to some extent to create a cavity 28. The body 20 of each arm 12, 14 has a rigid channeled cross-section connecting the pivot end 16 to the workpiece engaging or grasping end 22. The length of the body 20 is a function of design choice and intended use of the tongs 10. Finally, the grasping end 22 of each arm 12, 14 culminates in a somewhat flattened, broad food-engaging member having first and second edges 30, 32, respectively. The edges 30, 32 preferably meet to form a pointed or rounded tip 34, as desired. The first edge 30 is preferably formed of a scalloping to allow manipulation of larger-sized items. The second edge 32 is then formed of a more fine toothed design to permit manipulation of petite-sized items. Other configurations of the edges 30, 32 are certainly possible to achieve the dual purpose of manipulating coarse and fine food items.

Alternatively, the workpiece engaging or grasping ends 22 may be completely different from one another. The ends 22 may be comprised of a fork-and-spoon-like design for salads, deeper members for scooping nuts and the like, flattened members for spatula-type use, or any combination thereof. Those skilled in the art would understand that such common heads, mixed and matched, would be within the scope of the pending claims, and would merely be a matter of design choice based on the primary intended function of the tongs 10.

Figure 2:
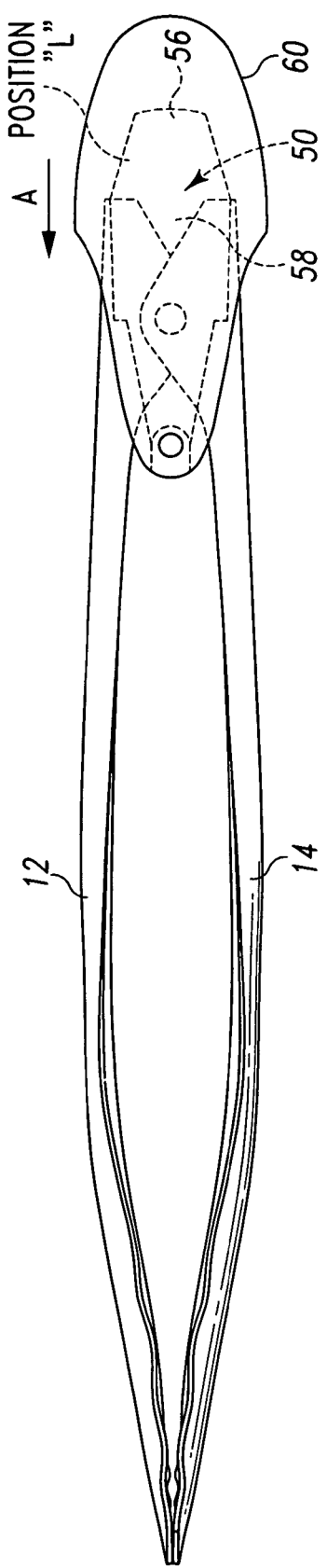
FIG. 2 is a top side view of an embodiment of the present tongs in a closed position.

Referring now to FIG. 4, a pivot pin 40 is shown to pass through the four lobes 24 at the pivot end 16 of each arm 12, 14 to secure the two components together. The pivot pin 40 permits movement of the arms 12, 14 relative to one another about the pin 40, passing through all points within the range of from an open position (FIG. 3) to a close position (FIG. 2). The arms 12, 14 of tongs 10 may be manufactured from a rigid material such as, but not limited to, steel, aluminum, plastic, or any combination thereof.

A biasing member 42, such as a spring, positioned with the cavity 28 forces outward the first arm 12 and the second arm 14 relative to one another about the pivot pin 40. A sliding locking plate 50 comprising a body 51 defining a slot 52 is also positioned within the cavity 28, as shown in FIG. 4. The pivot pin 40 passes through the slot 52 to allow movement of the sliding locking plate 50 in the direction of arrow A of FIG. 2. When forward, position "F" of FIG. 3, the tong arms 12, 14 are capable of free movement. When rearward, position "L" of FIG. 2, the tong arms 12, 14 are locked in a close position.

Figure 3:
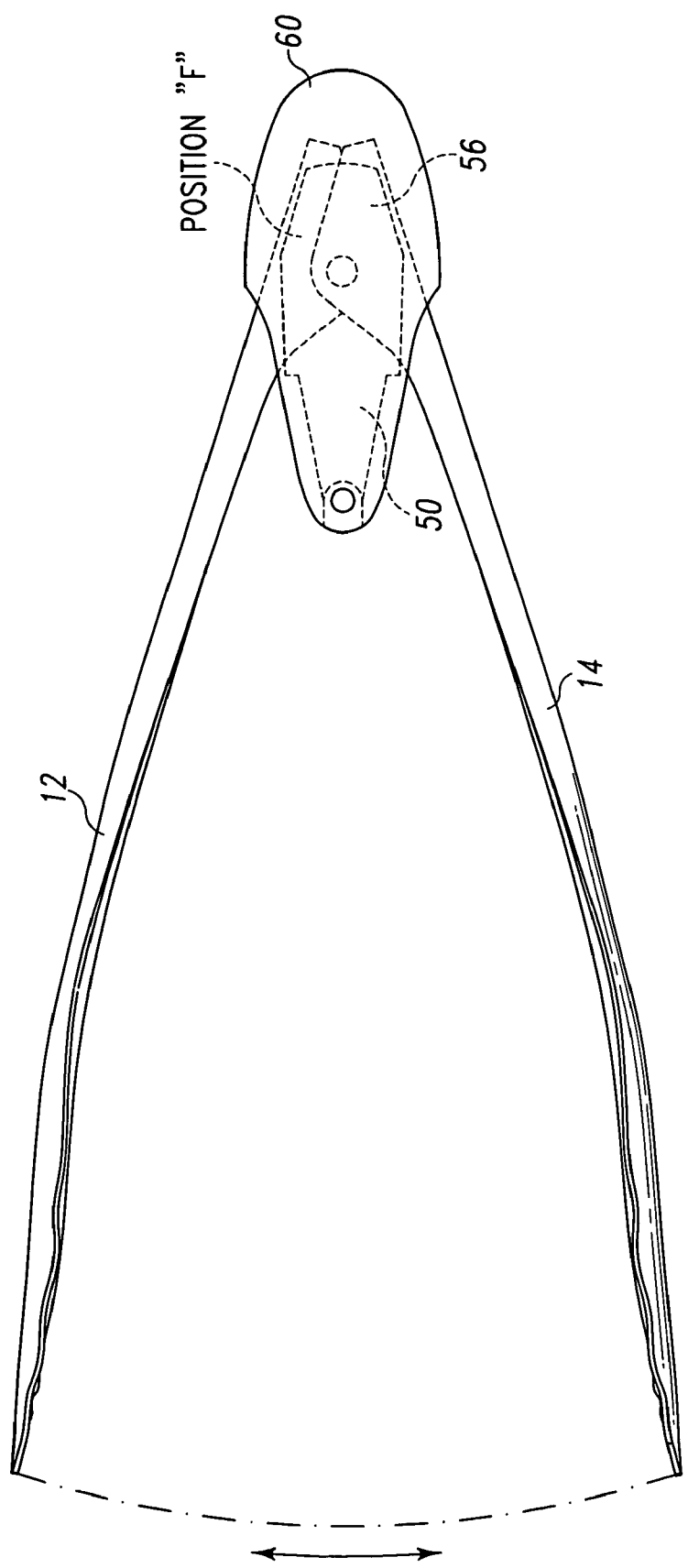
FIG. 3 is a top side view of the tongs of FIG. 2 in an open position.

The body 51 of the sliding locking plate 50 has first and second ends 54, 56 respectively, adjacent a middle section 58 having the slot 52. The first end 54 extends from middle section 58 to serve as a point of attachment for the handle 60, as shown in FIG. 4. A second pin 62 secures the handle 60 to the first end 54 of the body 20. Of course, other means for attaching the handle 60 to the sliding locking plate 50 may also be used without departing from the spirit of the claimed invention. In use, the handle attachment is positioned between the two tong arms 12, 14, as shown in FIG. 3.

The locking feature of the sliding locking plate can best be explained with reference to FIGS. 2-5. The second end 56 of the body 51 also tapers from the middle section 58 to allow movement of the arms 12, 14 without interfering with the pivot ends 16 when in the "F" position. However, when the sliding locking plate 50 is moved rearward to the "L" position by sliding the handle 60, the middle section 58 now interferes with the pivot ends 16 of the tong arms 12, 14 to counter the force of the biasing member 42. The sliding locking plate 50 may be comprised of any suitable rigid metal or non-metal material, made by any suitable molding or machining process.

Figure 5:
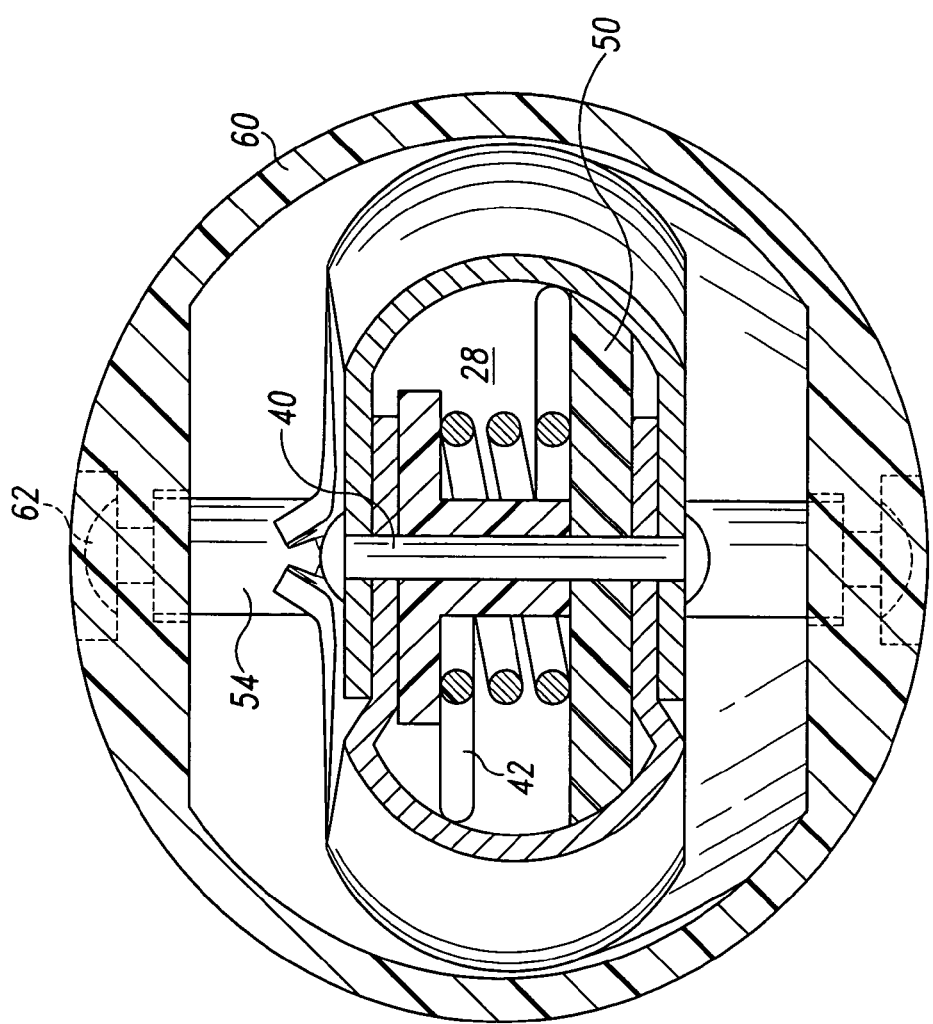
FIG. 5 is a cross-section of the handle section of the tongs of FIG. 1.

Referring to FIGS. 4 and 5, the handle 60 is shown as a relatively rigid, bulbous component encapsulating the sliding locking plate 50 as well as the pivot ends 16 of the tong arms 12, 14. By encapsulating the locking mechanism and pivot point, the handle 60 protects these component from contamination during use, thereby maintaining the tongs' usefulness. The teardrop shape of the handle 60 provides optimal protection with optimal allowance for movement of the arms 12, 14. The handle 60 is preferably made of a rigid molded thermoplastic material having a closed end 64 and an open end 66. The closed end 64 includes a drain hole 70 to allow liquid, such as dishwater, to evacuate the handle 60. The open end 66 includes attachment point 63 for connecting the handle 60 to the sliding locking plate 50 and is designed with openings on either side of the attachment point 63. The openings are created with sufficient clearance to allow full range of motion to the tong arms 12, 14.

In use, the handle 60 is pushed forward to disengage the locking mechanism of the sliding locking plate 50. The handle 60, being attached to the sliding locking plate 50, moves the plate 50 from the "L" position to the "F" position. The tong arms 12, 14 are immediately forced outward by the biasing member 42 within the cavity 28. The first edge 30 of the grasping ends may be used for picking up large items, while the second edge 32 may be used for smaller items, as previously described. A ring or loop (not shown) may be attached to the handle 60 to permit hanging of the tongs 10 during non-use.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

We claim:

1. A pair of tongs comprising:
   a first arm having a workpiece engaging end and a pivot end;
   a second arm having a workpiece engaging end and a pivot end, wherein the first and second arms are pivotally connected together proximate their respective pivot ends by a pivot pin to allow pivoting of the first and second arms to all points within a range from an open position to a close position;
   a biasing member positioned to engage and bias the first and second arms to the open position;
   a sliding locking plate having a slot through which the pivot pin passes to allow movement of the locking plate between a first position and a second position, and a body adjacent the slot such that the body engages the pivot ends of the first and second arms when in the first position to lock the arms in a close position; and
   a handle encapsulating and coupled to the locking plate.

2. The pair of tongs as set forth in claim 1, wherein the handle is comprised of a rigid material.

3. The pair of tongs as set forth in claim 2, wherein the handle is further comprised of a resilient material.

4. The pair of tongs as set forth in claim 1, wherein the locking plate is comprised of a rigid material.

5. The pair of tongs as set forth in claim 1, wherein the handle encapsulates the pivot end of the first arm and the second arm.

6. The pair of tongs as set forth in claim 1, wherein movement of the handle actuates the locking plate between the first position and the second position.

7. The pair of tongs as set forth in claim 1, wherein the handle comprises a drain hole.

8. The pair of tongs as set forth in claim 1, wherein the handle is a bulbous structure encasing the pivot end of the first and second arms.

9. The pair of tongs as set forth in claim 8, wherein the handle couples to the locking plate at a point between the first and second arms.

10. The pair of tongs as set forth in claim 1, wherein the workpiece engaging ends of the first arm and the second arm have first and second edges and wherein a portion of the first edge of at least one of the workpiece engaging ends is scalloped and a portion of the second edge of at least one of the workpiece engaging ends is serrated.

11. A kitchen utensil comprising:
- a first arm having a workpiece engaging end and a pivot end;
- a second arm having a workpiece engaging end and a pivot end, wherein the first and second arms are pivotally connected together proximate their respective pivot ends by a pivot pin to allow pivoting of the first and second arms relative to one another between an open position and a closed position, wherein the arms form a V-shape in the open position;
- a biasing member positioned to engage and bias the first and second arms to the open position;
- a non-metal sliding locking plate having a slot defined therein and through which the pivot pin passes to allow movement of the locking plate between a first position and a second position, and a body adjacent the slot such that the body engages the pivot ends of the first and second arms when in the first position to lock them in a closed position; and
- a non-metal handle encapsulating and coupled to the locking plate.

12. The kitchen utensil of claim 11, wherein the non-metal handle is comprised of a rigid material.

13. The kitchen utensil of claim 12, wherein the non-metal handle is further comprised of a resilient material.

14. The kitchen utensil of claim 11, wherein the locking plate is comprised of a rigid material.

15. The kitchen utensil of claim 11, wherein the non-metal handle encapsulates the pivot end of the first arm and the second arm.

16. The kitchen utensil of claim 11, wherein movement of the handle actuates the locking plate between the first position and the second position.

17. The kitchen utensil of claim 11, wherein the handle comprises a drain hole.

18. The kitchen utensil of claim 11, wherein the handle is a bulbous structure encasing the pivot end of the first and second arms.

19. The kitchen utensil of claim 18, wherein the handle couples to the locking plate at a point between the first and second arms.

20. The kitchen utensil of claim 11, wherein the workpiece engaging ends of the first arm and the second arm have first and second edges and wherein a portion of the first edge of at least one of the workpiece engaging ends is scalloped and a portion of the second edge of at least one of the workpiece engaging ends is serrated.

* * * * *